United States Patent
Holder

(10) Patent No.: US 7,114,431 B1
(45) Date of Patent: Oct. 3, 2006

(54) FLUID POWERED APPARATUS FOR OPERATING A MECHANISM DURING AN EMERGENCY

(75) Inventor: Robert Edward Holder, Los Angeles, CA (US)

(73) Assignee: Eaton Corporation, Cleveland, OH (US)

(*) Notice: Subject to any disclaimer, the term of this patent is extended or adjusted under 35 U.S.C. 154(b) by 29 days.

(21) Appl. No.: 11/045,205

(22) Filed: Jan. 28, 2005

(51) Int. Cl.
*F15B 13/04* (2006.01)
*F15B 21/00* (2006.01)

(52) U.S. Cl. ............................................. 91/436; 91/5
(58) Field of Classification Search ............ 91/5, 91/436, 446; 137/512, 512.3
See application file for complete search history.

(56) References Cited

U.S. PATENT DOCUMENTS

| | | | |
|---|---|---|---|
| 3,031,845 A * | 5/1962 | Ludwig | 60/632 |
| 4,083,187 A * | 4/1978 | Nagashima | 60/407 |
| 4,821,625 A * | 4/1989 | Sundberg | 91/516 |
| 5,168,705 A * | 12/1992 | Hirata et al. | 60/452 |
| 5,832,805 A * | 11/1998 | Kurashima et al. | 91/29 |
| 6,279,315 B1 * | 8/2001 | Harju | 60/410 |
| 6,666,476 B1 * | 12/2003 | Rink et al. | 280/741 |
| 6,685,139 B1 * | 2/2004 | Blum et al. | 244/129.5 |

FOREIGN PATENT DOCUMENTS

WO PCT/EP2003/012374   5/2004

* cited by examiner

Primary Examiner—Edward K. Look
Assistant Examiner—Michael Leslie
(74) Attorney, Agent, or Firm—George E. Haas; Quarles & Brady LLP

(57) ABSTRACT

An apparatus includes a reservoir of a pressurized fluid connected to a supply conduit. A fluid powered actuator has a first port and an second port. A volumetric flow regulator has a valve element that controls fluid flow between an inlet chamber which receives fluid from the supply conduit and an outlet chamber connected to the first port of the fluid powered actuator. A sensing orifice is coupled between the inlet chamber and the outlet chamber of the volumetric flow regulator, such that the valve element varies flow of fluid between the inlet chamber and the outlet chamber in response to a pressure differential across the sensing orifice. This apparatus ensures relatively constant velocity operation of the fluid powered actuator under varying load conditions. A damping mechanism is disclosed for slowing the fluid powered actuator as an end of its travel approaches.

35 Claims, 3 Drawing Sheets

FLUID POWERED APPARATUS FOR OPERATING A MECHANISM DURING AN EMERGENCY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to fluid powered actuator systems for operating a mechanism, such as an aircraft door, in an emergency; and more particularly to an apparatus which controls the discharge of pressurized fluid into an actuator that operates the mechanism.

2. Description of the Related Art

Commercial aircraft incorporate mechanisms for opening the doors of the passenger cabin in the event of an emergency. One known emergency door activating mechanism utilizes a piston/cylinder assembly that is operatively connected between the body of the aircraft and the door. A reservoir of gas, such as nitrogen, under high pressure is connected to the cylinder. When it is desired to open the door in an emergency situation, the pressurized nitrogen is released from the reservoir and applied to the cylinder thereby rapidly moving the piston and opening the door.

The prior systems which utilized a reservoir of pressurized gas suffered from the disadvantage that aging of the seals allowed the gas to leak from the reservoir over time. Thus, the system required frequent inspection and periodic maintenance to ensure that the high pressure gas was maintained in the reservoir for use in an emergency. This resulted in additional labor associated with monitoring and replacing the failed components. Furthermore, the aircraft had to be grounded if the emergency door activation system was not operational.

Although the emergency door activation system must rapidly operate the door to a fully open position, it should do so without damaging the door and other parts of the aircraft. It should be recognized that in many emergency situations, the aircraft is not severely damaged and can be repaired for subsequent use. As a consequence, activation of the emergency door system ought not result in further aircraft damage which results in additional repair costs. One prior solution involved a shock absorber hydraulic damping device, but that added extra weight to the aircraft which was disadvantageous.

It is therefore desirable to provide an apparatus for operating aircraft doors or other mechanical devices in an emergency, wherein the apparatus does not require frequent monitoring and operates in a manner which does not produce additional damage.

SUMMARY OF THE INVENTION

An apparatus for operating a mechanism in an emergency comprises a source that furnishes pressurized fluid into a supply conduit. A fluid powered actuator includes a first port that is operably coupled to receive fluid from the supply conduit and has an second port. A sensing orifice is connected to the fluid powered actuator so that fluid either entering that actuator through the first port or exiting the actuator from the second port flows through the sensing orifice. A pressure differential is created across the sensing orifice by fluid flow there through.

A volumetric flow regulator connected to the sensing orifice and having a valve element that moves in response to the pressure differential. Motion of the valve elements varies flow of fluid from a fluid inlet to a fluid outlet in response to the pressure differential across the sensing orifice. In one embodiment, the fluid inlet is connected to the supply conduit and the fluid outlet is connected to the first port of the fluid powered actuator. In another embodiment, the fluid inlet is connected to the second port to control the flow of fluid from the fluid powered actuator.

The one embodiment may also include a first check valve and a first orifice connected in series between the first port and the second port of the fluid powered actuator. The first check valve permits fluid to flow only in a direction from the second port to the first port. In addition, a second check valve and a second orifice may be connected in series between the supply conduit and the second port of the fluid powered actuator. The second check valve permits fluid to flow only in a direction from the supply conduit to the second port. This combination of check valves and orifices dampens motion of the fluid powered actuator as the end of its travel approaches.

DETAILED DESCRIPTION OF THE INVENTION

Figure 1:
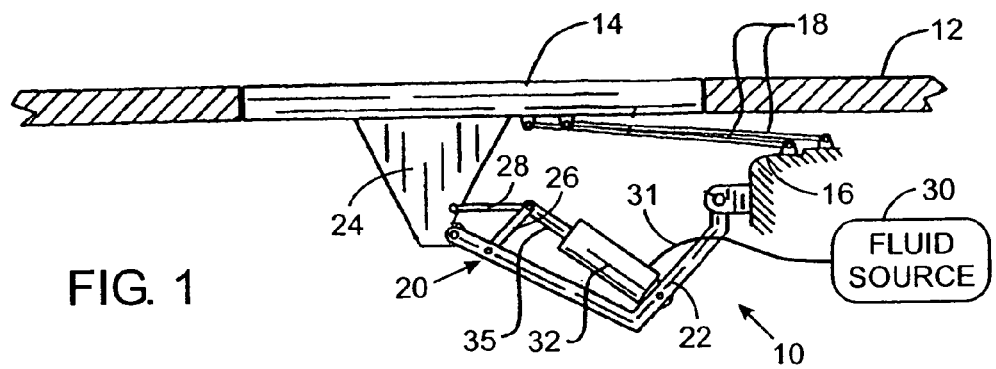
FIGS. 1–3 schematically illustrate sequential movement of an aircraft door from a closed position in FIG. 1 to a fully open position in FIG. 3 in response to operation of an emergency activation apparatus.

With initial reference to FIG. 1, the present invention is being described in the context of an aircraft 12 having a door 14 which is required to be opened during an emergency. However, the inventive concept may be applied to operate other devices in case of an emergency or under other circumstances. The door 14 is moveably connected to the frame 16 of the aircraft 12 by a pair of ties 18, each of which is pivotally connected at opposite ends to the door 14 and to the aircraft frame 16. That connection enables the door 14 to swing outward from the aircraft 12 to allow people to enter or exit the aircraft through the doorway.

The emergency activating apparatus 10 includes a linkage 20 having a generally L-shaped first arm 22 with one end pivotally connected to the aircraft frame 16 and an opposite end pivotally attached to a bracket 24 secured to the inside surface of the door 14. A second arm 26 is pivotally coupled between the first arm 22 and a third arm 28, that has an end that is connected at a pivot to the door bracket 24. A pressurized fluid source 30 which is hooked up by a conduit 31 to a pneumatic cylinder 32. The cylinder 32 is attached to the first arm 22 and operates a cylinder piston 34 that has a rod 35 connected at the junction between the second and third arms 26 and 28.

Figure 2:
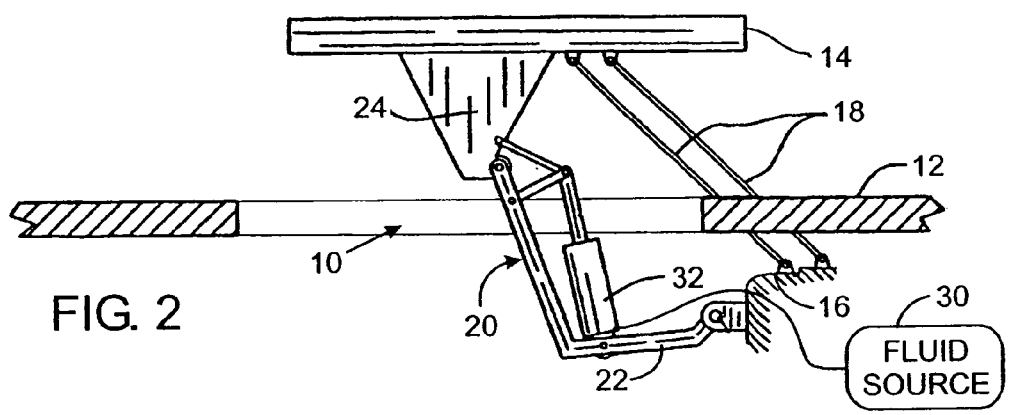
Figure 3:
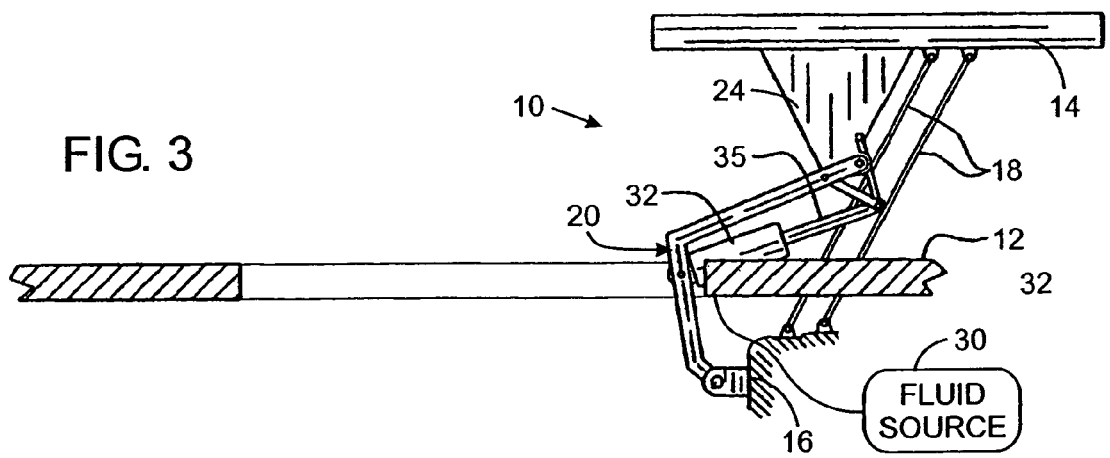

When the door 14 is in the closed position, as illustrated in FIG. 1, activation of the fluid source 30 applies pressurized fluid to the cylinder 32 causing the cylinder piston 34 to extend farther from the cylinder, thereby applying force to the linkage 20. The application of that force moves the arms 22, 26 and 28 with respect to one another, in a way that forces the door 14 outward from the opening in the aircraft, as depicted by an intermediate position of the door in FIG. 2. Further application of pressurized fluid to the cylinder 32 applies additional force to the linkage so that the door continues to move outward. Ultimately, the door 14 reaches a fully opened position, illustrated in FIG. 3.

Figure 4:
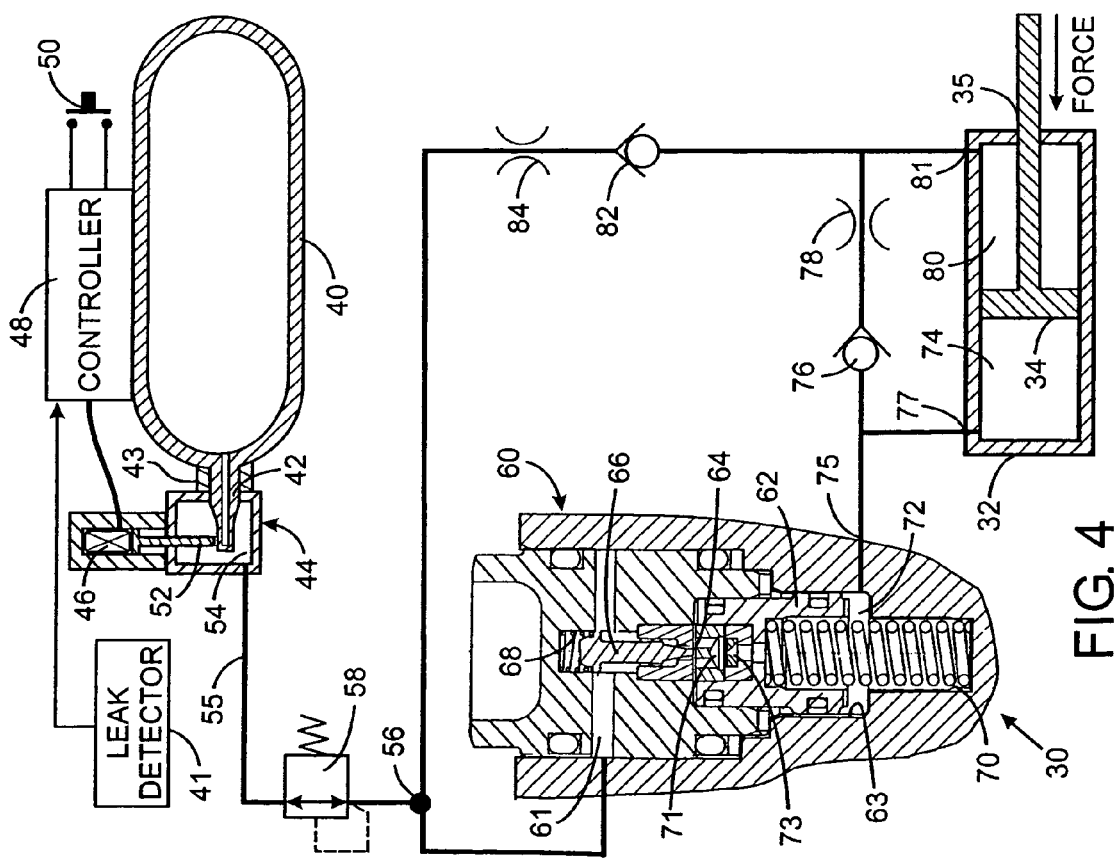
FIG. 4 depicts the fluid power circuit of the emergency activation apparatus.

With reference to FIG. 4, the fluid source 30 comprises a reservoir 40 that contains a pressurized gas, such as nitrogen for example. The reservoir 40 also may contain a small amount of helium as a tracer, so that a helium leak detector 41 can be placed adjacent the reservoir to confirm that there is no leakage. Helium passes through smaller openings than nitrogen because of its smaller molecule size and thus will allow detection of a smaller leak. Preferably, the reservoir 40 has a single piece construction or is welded to minimize areas where leaks may develop. The reservoir has an integral nozzle 42 that extends via a gas tight fitting 43 into a release actuator 44 which contains an explosive charge 46. A controller 48 electrically detonates the explosive charge 46 in response to operation of a manual electrical switch 50 when it is desired to open the aircraft door 14 in an emergency. Other types of manual and automatic trigger mechanisms can be provided. Detonation of the explosive charge 46 drives a piston 52 laterally against the tip of the nozzle 42. The nozzle is made of a relatively frangible metal which breaks off upon impact by the piston 52, thereby releasing the pressurized gas from the reservoir into a chamber 54 of the release actuator 44.

The chamber 54 is connected by a supply conduit 55 to a circuit node 56 by a conventional pressure reducer/relief valve 58 that maintains the pressure within the remainder of the fluid source 30 below a predefined level. The circuit node 56 is connected to an inlet chamber 61 of a volumetric flow regulator (VFR) 60 which controls the fluid flow to maintain a relatively constant velocity of the actuator cylinder piston 34 under varying load conditions. The volumetric flow regulator 60 with a bore 63 with a valve seat 64 therein and a poppet 66 that is biased by a first spring 68 toward the valve seat 64 to control fluid flow from the inlet chamber 61 to an intermediate chamber 71 on the opposite side of the valve seat. A control piston 62 is slidably received within the bore 63 between the poppet 66 and an outlet chamber 72 of the volumetric flow regulator 60. The control piston 62 has a fixed sensing orifice 73 between the intermediate chamber 71 and the outlet chamber 72.

The volumetric flow regulator 60 has an unbalanced control piston area that responds to a differential pressure across the fixed sensing orifice 73. That causes the control piston 62 to modulate the opening of the variable orifice between the poppet 66 and the valve seat 64 to maintain a fixed ratio of inlet and outlet chamber pressures across the sensing orifice 73. For ideal gas law operation, that fixed pressure ratio tends to produce a constant velocity of the cylinder piston 34. Although real world factors exist which cause the volumetric flow regulator 60 to deviate from the perfect conditions, such factors are significantly less than the primary effects of load variation and regulated pressure variation which are handled effectively by the volumetric flow regulator.

The outlet chamber 72 of the volumetric flow regulator 60 is connected through a fluid outlet 75 to the a first port 77 of the head chamber 74 of the cylinder 32 and also through a first check valve 76 and a first orifice 78 to a second port 81 of the cylinder rod chamber 80. The first check valve 76 allows fluid to flow only from the rod chamber 80 to the head chamber 74. The rod chamber 80 also is connected to the node 56 via a series connection of a second check valve 82 and a second orifice 84. The second check valve 82 allows fluid to flow only in a direction from the node 56 into the rod chamber 80.

With continuing reference to FIG. 4, during an emergency, the door activation system is actuated by a person within the aircraft closing the emergency electrical switch 50 which causes the controller 48 to detonate the explosive charge 46. That explosion drives the actuation piston 52 against the tip of the reservoir nozzle 42 which results in the tip breaking away, releasing the pressurized fluid (e.g. nitrogen gas) within the reservoir 40. That pressurized fluid travels through the pressure reducer/relief valve 58 and the node 56 to the inlet chamber 61 of the volumetric flow regulator 60. The net force from the springs 68 and 70 and the pressure differential forces the poppet 66 away from the valve seat 64 enabling the fluid to flow to the intermediate chamber 71, through sensing orifice 73 and then from the outlet chamber 72 into the head chamber 74 of the cylinder 32. The first check valve 76 prevents the flow of pressurized fluid from the outlet chamber 72 to the cylinder rod chamber 80. The increase in pressure in the cylinder head chamber 74 drives the cylinder piston 34 which applies force to the linkage 20, opening the door 14 in FIGS. 1–3. The force exerted on the door at this time is sufficient to overcome any opposing wind load, the mass of the door and other forces that impede door motion.

Simultaneously, the fluid flows from the node 56 through the second orifice 84 and the second check valve 82 to the rod chamber 80 of the cylinder 32. However, pressure increases in the rod chamber 80 at a slower rate than in the head chamber 74 because of flow restriction provided by the second orifice 84. Therefore, immediately following activation, the cylinder piston 34 encounters little resistance to being driven to open the door 14.

As the release of the pressurized gas continues, pressure builds up within the cylinder rod chamber 80 due to that chamber's reduction in the size from motion of the cylinder piston 34 and fluid slowly flowing through the second orifice 84 and second check valve 82. As the door 14 approaches the end of its travel, the pressure within the rod chamber 80 becomes greater than pressure in the head chamber pressure. This results in the in the rod chamber 80 exceeding the pressure at node 56 the second check valve 82 closes preventing backward fluid flow. At this point, fluid is forced from the rod chamber 80 through the first orifice 78 and the first check valve 76 opens. As the pressure in the rod chamber 80 and the head chamber 74 becomes balanced, the net force acting on the cylinder piston 34 is determined by the difference of the piston surface areas in those chambers, i.e. the pressure times the cross-sectional area of the piston rod 35. This net force is significantly reduced compared to the maximum force that occurred upon initiation of the door activation. Although the forces opposing the door motion typically also reduce near the end of that travel, the equalization of the cylinder chamber pressures produces a reduction in speed of the door 14. That damping of the door motion reduces the likelihood that the door will be damaged upon reaching the fully open position.

The volumetric flow regulator 60 maintains a constant relationship between pressures in the intermediate and outlet chambers 71 and 72 to the sensing orifice 73, thereby producing a constant volumetric flow to the cylinder 32. A constant volumetric flow is highly desirable for operating the emergency activating apparatus 10. Without the volumetric flow regulator 60, the velocity of the cylinder piston 34 will be significantly slower under high opposing loads as compared to smaller load conditions. This results in a dissipation of a lesser amount of kinetic energy. In addition, the decreased piston velocity allows a longer time for the opposing fluid pressure within the cylinder to increase. If the opposing pressure orifice 84 is set for lower energy dissipation, and a longer pressure rise time (e.g. a smaller orifice), then with smaller opposing loads, insufficient fluid pressure will exist in the rod end to dissipate the energy and the cylinder piston 34 will "bottom out" in the cylinder 32. Alternatively, if the opposing pressure orifice 84 is set for lesser loads (e.g. a larger orifice), then under high opposing loads there will be too much fluid in the rod chamber and the cylinder piston 34 will not reach the end of its travel fast enough and could even resonate in mid-stroke. In order to achieve a repeatable energy dissipation it is necessary to maintain a repeatable velocity under varying load conditions. The volumetric flow regulator 60 functions to meter the fluid flow so that a relatively constant piston velocity occurs under varying loads.

Figure 5:
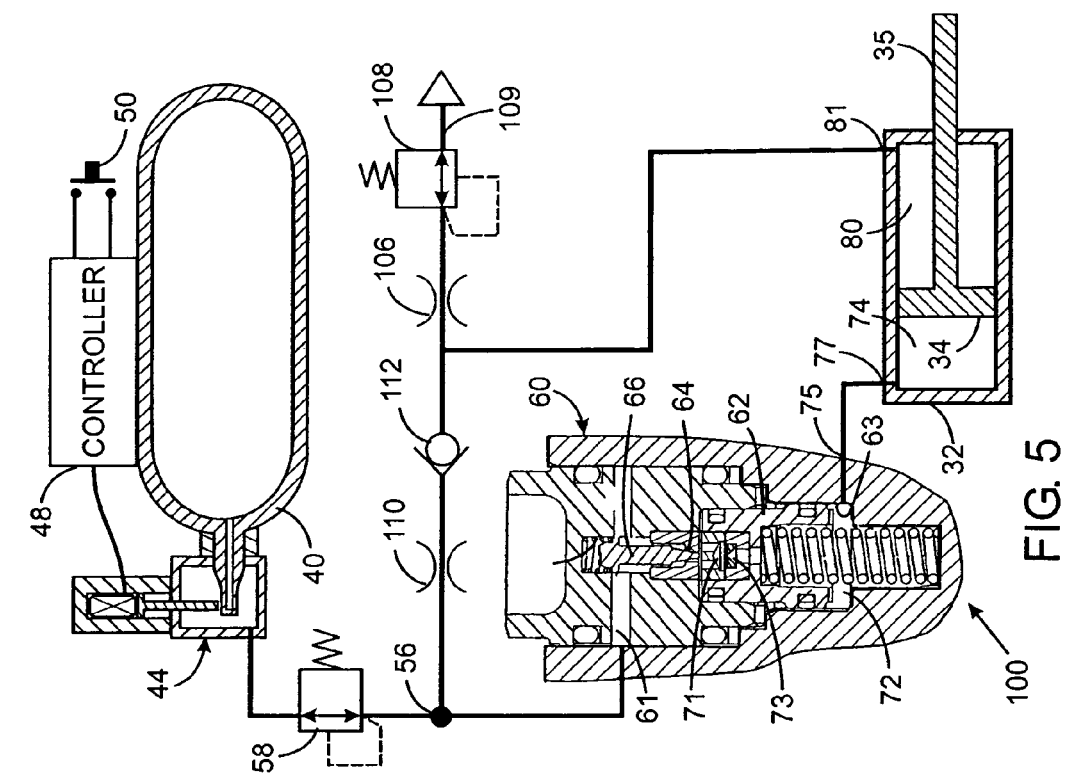
FIG. 5 illustrates a second embodiment of the fluid power circuit.

The designs of the first emergency activation apparatus in FIG. 1 is energy efficient in that the fluid being exhausted from the rod chamber of the actuator cylinder 32 is fed back to the expanding head chamber 74. However, doing so reduces the net force at the end of the cylinder piston stroke. This is not a concern with respect to activating an aircraft door as the door load also becomes lower near its fully opened position. However, other mechanisms to be activated in an emergency may encounter a greater load near the end the stroke of the cylinder piston 34. For these situations, a second emergency activation apparatus 100 is shown in FIG. 5. The second apparatus 100 has similar components which apply pressurized fluid to the node 56 as the fluid source 30 shown in FIG. 4, and those identical components have been assigned the same reference numerals.

In the second emergency activation apparatus 100, the fluid in the rod chamber 80 can either be exhausted to the atmosphere or received by another reservoir via a first orifice 106 and a pressure relief valve 108 connected to a return conduit 109. The first orifice 106 and the second pressure relief valve 108 allow the pressure within the cylinder rod chamber 80 to be relatively high when there is a significant flow across the first orifice, but lower under steady state conditions. In some applications of a single ended cylinder, such an emergency aircraft door, the pressure relief valve 108 could be eliminated. A second orifice 110 and a check valve 112 prevent the rod chamber fluid from flowing into the node 56, while allowing fluid flow from the node 56 to the rod chamber 80 immediately after system activation.

The second emergency activation apparatus 100 operates in the same manner as described previously with respect to the system in FIG. 4, except that the fluid exhausted from the rod chamber 80 of the cylinder 32 is not fed back into the head chamber 74.

Figure 6:
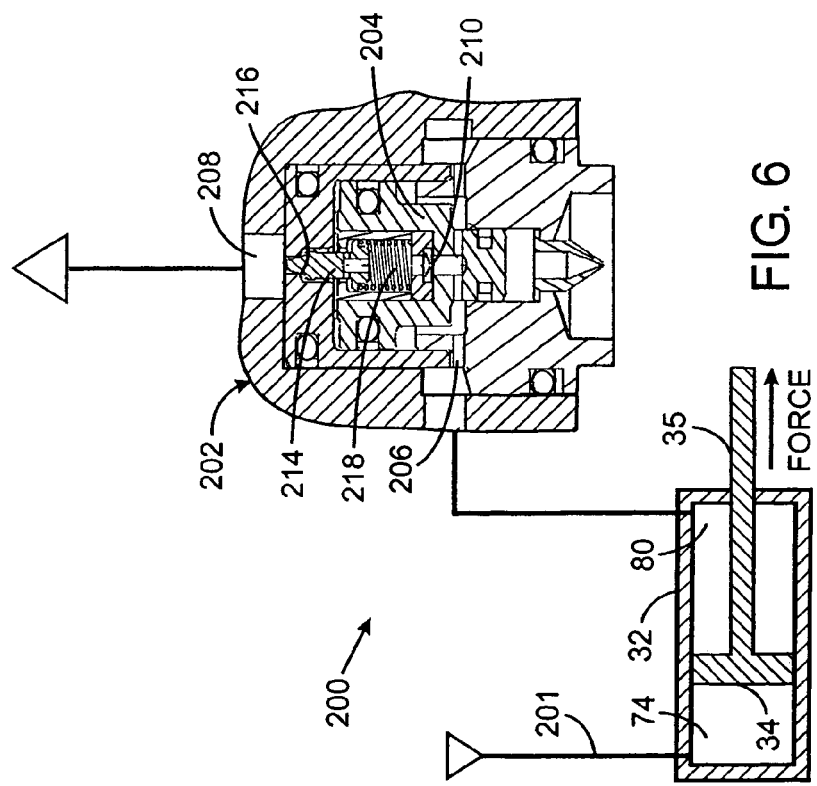
FIG. 6 shows a third embodiment of the circuit according to the present invention.

Referring to FIG. 6, a third emergency activation apparatus 200 utilizes a different type of volumetric flow regulator 202 for situations where the force acting on the cylinder piston 34 aids extension of that piston from the cylinder 32. This second type of volumetric flow regulator 202 is located in the exhaust conduit for the rod chamber 80 of the cylinder 32.

Specifically, the head cylinder chamber 74 receives pressurized fluid directly from a supply via conduit 201. The second volumetric flow regulator 202 has a control piston 204 slidably received therein and defining an inlet chamber 206 and an outlet chamber 208. The inlet chamber 206 is connected directly to the rod chamber 80 of cylinder 32. A fixed sensing orifice 210 in the control piston 204 provides a path between the inlet chamber 206 and an intermediate chamber 2188. A valve member 214 biased by a spring with respect to the control piston 204 selectively engages a valve seat 212 to close communication between the intermediate chamber 218 and the outlet chamber 208 of the second volumetric flow regulator 202.

With the third emergency activation apparatus 200, after pressurizing the rod chamber 80, application of pressurized fluid to the head chamber 74 drives the cylinder piston 34 to extend the piston rod 35 from the cylinder 32. As the motion of the cylinder piston 34 reduces the volume of the rod chamber 80, fluid is forced from that latter chamber into the inlet chamber 206 of the second volumetric flow regulator 202. That fluid also is applied to the intermediate chamber 218 through the sensing orifice 210. The continued flow of fluid from the intermediate chamber 218 through the fluid outlet chamber 208 is modulated in response to the pressure differential across the sensing orifice 210 as replicated in the inlet and outlet chambers 206 and 208. That modulation of the flow through the second type of volumetric flow regulator 202 maintains motion of the cylinder piston 34 at a relatively constant velocity.

Figure 7:
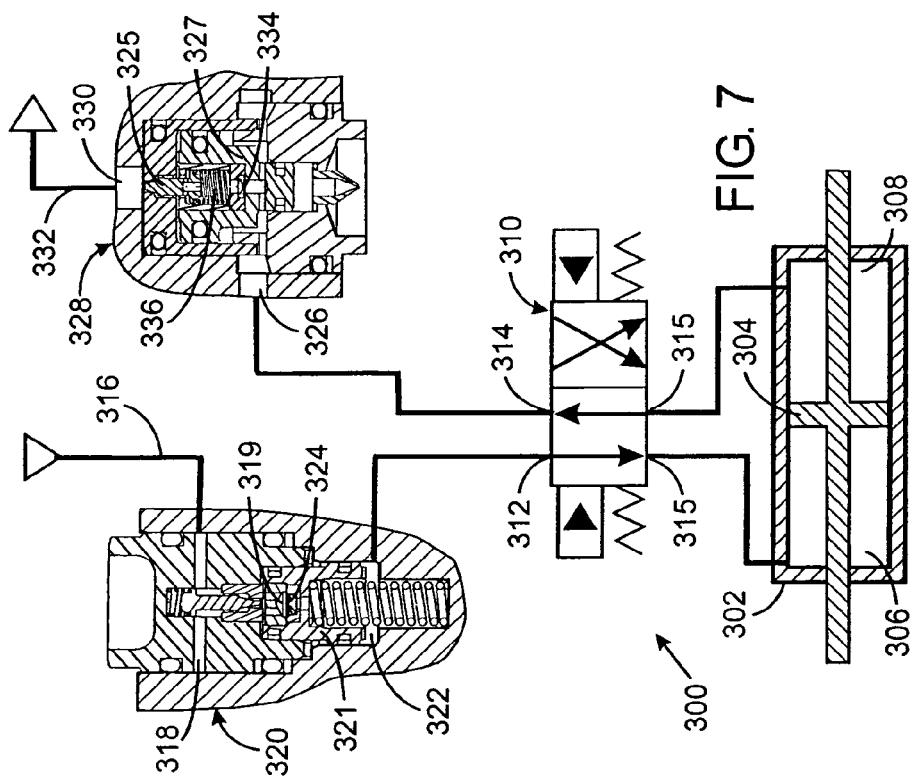
FIG. 7 is a fourth embodiment of the fluid power circuit for use with a bidirectional actuator.

FIG. 7 illustrates an example of the present inventive concept applied to an fourth emergency activation apparatus 300 that operates a double acting fluid cylinder 302 and cylinder piston 304. The flow of fluid to and from the head and rod chambers 306 and 308, respectively, is governed by a two-position, directional control valve 310 that has a supply inlet port 312, an return port 314 and two workports 315. The head and rod chambers 306 and 308 of the double acting fluid cylinder 302 are connected to the workports 315. The directional control valve 310 is electrically operated by a pair of solenoids, for example.

The supply line 316, which provides pressurized fluid to the fourth emergency activation apparatus 300, is connected to the inlet chamber 318 of a volumetric flow regulator 320, that is identical to the volumetric flow regulator 60 in FIG. 4. The volumetric flow regulator 320 has a control piston 321 and an outlet chamber 322 that is connected to the inlet port of the directional control valve 310. A first fixed sensing orifice 324 is connected between the intermediate and outlet chambers 319 and 322 of the volumetric flow regulator 320. The return port 314 of the directional control valve 310 is directly coupled to the inlet chamber 326 of a return volumetric flow regulator 328 of the same design as the second volumetric flow regulator 202 in FIG. 6. An outlet chamber 330 of the return volumetric flow regulator 328 is connected to a fluid return line 332 and second fixed sensing orifice 334 is connected between the inlet and intermediate chambers 326 and 336. A poppet controls fluid flow between the intermediate chambers 326 and the outlet chamber 330.

The fourth emergency activation apparatus 300 enables the cylinder piston 304 to move in either direction within the cylinder 302 depending upon the position of the directional control valve 310. Because both the fluid being supplied to the cylinder 302 and being exhausted therefrom, are controlled by separate volumetric flow regulators 320 and 328, the flows are held relatively constant regardless of the direction at which external forces act on the piston 304. This operation maintains a constant velocity of the piston motion.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An apparatus for operating a mechanism in an emergency, said apparatus comprising:
   a source of pressurized fluid;
   a supply conduit connected to the source;
   a fluid powered actuator connected to operate the mechanism and having a first port operably coupled to receive fluid from the supply conduit and having a second port;
   a sensing orifice through which fluid flows either to the first port or from the second port, thereby creating a pressure differential across the sensing orifice; and
   a volumetric flow regulator having bore with a valve element defining an inlet chamber and an outlet chamber within the bore, the inlet chamber communicating with one side of the sensing orifice and the outlet chamber communicating with another side of the sensing orifice, wherein the valve element varies flow of fluid between the inlet and outlet chambers in response to the pressure differential across the sensing orifice.

2. The apparatus as recited in claim 1 further comprising a pressure reducer/relief valve coupling the source to the inlet chamber of the volumetric flow regulator.

3. The apparatus as recited in claim 1 wherein the source comprises:
   a reservoir of a pressurized fluid; and
   a release actuator that discharges the pressurized fluid from the reservoir into a supply conduit during an emergency.

4. The apparatus as recited in claim 1 further comprising a first check valve and a first orifice connected in series between the first port and the second port of the fluid powered actuator, wherein the first check valve permits fluid to flow only in a direction from the second port to the first port.

5. The apparatus as recited in claim 4 further comprising a second check valve and a second orifice connected in series between the supply conduit and the second port of the fluid powered actuator, wherein the second check valve permits fluid to flow only in a direction from the supply conduit to the second port.

6. The apparatus as recited in claim 1 further comprising a check valve and a first orifice connected in series between the supply conduit and the second port of the fluid powered actuator, wherein the check valve permits fluid to flow only in a direction from the supply conduit to the second port.

7. The apparatus as recited in claim 6 further comprising a second orifice operably connected to enable fluid to flow from the second port into a return conduit.

8. The apparatus as recited in claim 7 further comprising a pressure relief valve connected in series with the second orifice between the second port and the return conduit.

9. The apparatus as recited in claim 1 further comprising a directional control valve having a first position in which the outlet chamber of the volumetric flow regulator is connected to the first port of the fluid powered actuator, and a second position in which the outlet chamber of the volumetric flow regulator is connected to the second port of the fluid powered actuator.

10. An apparatus for operating a mechanism in an emergency, said apparatus comprising:
    a reservoir of a pressurized fluid;
    a supply conduit;
    release actuator that releases the pressurized fluid from the reservoir into the supply conduit during an emergency;
    a fluid powered actuator having a first port and an second port;
    a volumetric flow regulator having bore with a control piston slidably received therein and forming an inlet chamber and an outlet chamber within the bore, the inlet chamber being connected to the supply conduit, and the outlet chamber being connected to the first port of the fluid powered actuator; and
    a sensing orifice coupled between the inlet chamber and the outlet chamber of the volumetric flow regulator, wherein the control piston varies flow of fluid between the inlet chamber and the outlet chamber in response to a pressure differential across the sensing orifice.

11. The apparatus as recited in claim 10 further comprising a pressure reducer/relief valve in the supply conduit.

12. The apparatus as recited in claim 10 wherein fluid powered actuator is a cylinder with a piston therein that forms a first chamber and a second chamber within the cylinder on opposite sides of the piston, wherein the first port opens into the first chamber and the second port opens into the second chamber.

13. The apparatus as recited in claim 10 further comprising a first check valve and a first orifice connected in series between the first port and the second port of the fluid powered actuator, wherein the first check valve permits fluid to flow only in a direction from the second port to the first port.

14. The apparatus as recited in claim 13 further comprising a second check valve and a second orifice connected in series between the supply conduit and the second port of the fluid powered actuator, wherein the second check valve permits fluid to flow only in a direction from the supply conduit to the second port.

15. The apparatus as recited in claim 10 further comprising:
    a check valve and a first orifice connected in series between the supply conduit and the second port of the fluid powered actuator, wherein the check valve permits fluid to flow only in a direction from the supply conduit to the second port; and
    a second orifice connected between the second port of the fluid powered actuator and a return conduit.

16. The apparatus as recited in claim 15 further comprising a pressure relief valve connected in series with the second orifice between the second port of the fluid powered actuator and the return conduit.

17. The apparatus as recited in claim 10 further comprising a directional control valve having a supply inlet port connected to the outlet chamber of the volumetric flow regulator, two workports each connected to one of the first port and second port of the fluid powered actuator, and an return port, wherein the directional control valve has a first position in which the supply inlet port is connected to the first port and the return port is connected to the second port and a second position in which the supply inlet port is connected to the second port and the return port is connected to the first port.

18. The apparatus as recited in claim 17 further comprising
a return volumetric flow regulator having return bore with return control piston slidably received therein and forming a return inlet chamber and a return outlet chamber within the return bore, the return inlet chamber being connected to the return port of the directional control valve and the outlet chamber being connected to the first port of the fluid powered actuator; and
another sensing orifice is connected between the return inlet chamber and a return outlet chamber.

19. An apparatus for operating a mechanism in an emergency, said apparatus comprising:
a source of pressurized fluid;
a fluid powered actuator connected to the mechanism and having a first port and a second port; and
a volumetric flow regulator having a bore with an inlet chamber and an outlet chamber defined therein, the inlet chamber being coupled to the source and the outlet chamber being coupled to the first port of the fluid powered actuator, an intermediate chamber defined in the volumetric flow regulator and a sensing orifice through which fluid flows between the intermediate chamber and the outlet chamber, and having a valve element which varies flow of fluid through the outlet chamber in response to a pressure differential across the sensing orifice.

20. The apparatus as recited in claim 19 further comprising a pressure reducer/relief valve coupling the source to the inlet chamber of the volumetric flow regulator.

21. The apparatus as recited in claim 19 wherein the source comprises:
a reservoir of a pressurized fluid; and
a release actuator that discharges the pressurized fluid from the reservoir during an emergency.

22. The apparatus as recited in claim 19 further comprising a first check valve and a first orifice connected in series between the first port and the second port of the fluid powered actuator, wherein the first check valve permits fluid to flow only in a direction from the second port to the first port.

23. The apparatus as recited in claim 22 further comprising a second check valve and a second orifice connected in series between the source and the second port of the fluid powered actuator, wherein the second check valve permits fluid to flow only in a direction from the source to the second port.

24. The apparatus as recited in claim 19 further comprising a check valve and a first orifice connected in series between the source and the second port of the fluid powered actuator, wherein the check valve permits fluid to flow only in a direction from the source to the second port.

25. The apparatus as recited in claim 24 further comprising a second orifice operably connected to enable fluid to flow from the second port into a return conduit.

26. The apparatus as recited in claim 25 further comprising a pressure relief valve connected in series with the second orifice between the second port and the return conduit.

27. The apparatus as recited in claim 19 further comprising a directional control valve having a first position in which the outlet chamber of the volumetric flow regulator is connected to the first port of the fluid powered actuator, and a second position in which the outlet chamber of the volumetric flow regulator is connected to the second port of the fluid powered actuator.

28. An apparatus for operating a mechanism in an emergency, said apparatus comprising:
a sealed reservoir containing a fluid under pressure;
a supply conduit coupled to the reservoir;
a fluid powered actuator connected to operate the mechanism and having a port operably coupled to receive fluid from the supply conduit;
a sensing orifice through which fluid flows to the port of the fluid powered actuator, thereby creating a pressure differential across the sensing orifice; and
a volumetric flow regulator having bore with a valve element defining an inlet chamber and an outlet chamber within the bore, the inlet chamber communicating with one side of the sensing orifice and the outlet chamber communicating with another side of the sensing orifice, wherein the valve element varies flow of fluid between the inlet and outlet chambers in response to the pressure differential across the sensing orifice; and
a release actuator to break the reservoir and release the fluid into the supply conduit.

29. The apparatus as recited in claim 28 wherein the reservoir has an integral nozzle that is broken by activation of the release actuator.

30. The apparatus as recited in claim 28 wherein the release actuator contains an explosive charge which when activated breaks the reservoir.

31. The apparatus as recited in claim 28 further comprising:
a tracer gas within the reservoir; and
a leak detector that senses leakage of the tracer gas from the reservoir.

32. The apparatus as recited in claim 31 wherein the fluid is nitrogen and the tracer gas is helium.

33. An apparatus for operating a mechanism in an emergency, said apparatus comprising:
a sealed reservoir containing a fluid under pressure and having an integral nozzle;
a tracer gas within the reservoir;
a leak detector that senses leakage of the tracer gas from the reservoir;
a supply conduit coupled to the reservoir;
a fluid powered actuator connected to operate the mechanism and having a port operably coupled to receive fluid from the supply conduit; and
release actuator having an explosive charge which when activated breaks the integral nozzle of the reservoir, thereby releasing the fluid into the supply conduit during an emergency.

34. The apparatus as recited in claim 33 wherein the fluid is nitrogen and the tracer gas is helium.

35. The apparatus as recited in claim 33 wherein the release actuator breaks the integral nozzle from outside the reservoir.

* * * * *